United States Patent
Davis et al.

(10) Patent No.: US 9,157,721 B1
(45) Date of Patent: Oct. 13, 2015

(54) MEASURING SYSTEM

(71) Applicant: Bee Line Co., Bettendorf, IA (US)

(72) Inventors: Mark Davis, Davenport, IA (US); Don Gordon, Davenport, IA (US); Mike McCoy, Bettendorf, IA (US); Matthew Randall, Bettendorf, IA (US)

(73) Assignee: BEELINE COMPANY, Bettendorf, IA (US)

( * ) Notice: Subject to any disclaimer, the term of this patent is extended or adjusted under 35 U.S.C. 154(b) by 192 days.

(21) Appl. No.: 13/914,242

(22) Filed: Jun. 10, 2013

Related U.S. Application Data (60) Provisional application No. 61/657,470, filed on Jun. 8, 2012.

(51) Int. Cl.
*G01B 5/00* (2006.01)
*G01B 5/008* (2006.01)

(52) U.S. Cl.
CPC .................................. *G01B 5/008* (2013.01)

(58) Field of Classification Search
CPC ........ G01B 3/00; G01B 5/008; G01B 21/042; G01B 11/005; G01B 7/008; G01B 11/03; G01B 11/002; G01B 11/16; G01B 5/0004; G01B 5/02; G01B 5/20
USPC ........................................... 33/503, 556, 559
See application file for complete search history.

(56) References Cited

U.S. PATENT DOCUMENTS

| | | | | |
|---|---|---|---|---|
| 5,724,264 A * | 3/1998 | Rosenberg et al. | ........... | 702/152 |
| 5,887,356 A * | 3/1999 | Sheldon | ........................ | 33/556 |
| 6,202,316 B1 * | 3/2001 | Swift et al. | ..................... | 33/503 |
| 6,397,485 B1 * | 6/2002 | McMurtry | ...................... | 33/503 |
| 6,519,860 B1 * | 2/2003 | Bieg et al. | ........................ | 33/503 |
| 7,647,706 B2 * | 1/2010 | Jordil et al. | ..................... | 33/503 |
| 7,743,524 B2 * | 6/2010 | Eaton et al. | ..................... | 33/503 |
| 7,950,164 B2 * | 5/2011 | Nakayama et al. | ............. | 33/556 |
| 2003/0177653 A1 * | 9/2003 | Granger | ........................ | 33/556 |
| 2006/0266100 A1 * | 11/2006 | McMurtry et al. | ........... | 33/558.4 |
| 2007/0051179 A1 * | 3/2007 | McMurtry et al. | ............. | 73/760 |
| 2008/0127501 A1 * | 6/2008 | Eaton et al. | ..................... | 33/503 |
| 2008/0249737 A1 * | 10/2008 | Jordil et al. | ..................... | 33/503 |
| 2009/0025244 A1 * | 1/2009 | Jonas et al. | ..................... | 33/559 |
| 2010/0122920 A1 * | 5/2010 | Butter et al. | ................... | 206/223 |
| 2010/0198543 A1 * | 8/2010 | Teune | ............................. | 33/556 |
| 2011/0005095 A1 * | 1/2011 | Nakayama et al. | ............. | 33/556 |
| 2011/0083335 A1 * | 4/2011 | Yasuno et al. | ................... | 33/556 |
| 2011/0088271 A1 * | 4/2011 | Bridges | ............................ | 33/502 |
| 2011/0107611 A1 * | 5/2011 | Desforges et al. | ............. | 33/502 |
| 2014/0215841 A1 * | 8/2014 | Danbury et al. | ................ | 33/503 |

* cited by examiner

*Primary Examiner* — Yaritza Guadalupe-McCall (74) *Attorney, Agent, or Firm* — Hamilton IP Law, PC; Jay R. Hamilton; Charles A. Damschen (57) ABSTRACT

A measuring system includes a sensor and a positioner cooperatively engaged with the sensor. The measuring system may also include a base cooperatively engaged with the positioner such that the base and positioner cooperate to selectively secure the relative position of the sensor with respect to a first and second structure. The position of one of the structures may then be changed, and the sensor may detect the relative change in position. The sensor may communicate this change in position to a controller or other component for further processing.

14 Claims, 8 Drawing Sheets

MEASURING SYSTEM

CROSS REFERENCE TO RELATED APPLICATIONS

The present utility patent application claims the filing benefit of provisional U.S. Pat. App. No. 61/657,470 filed on Jun. 8, 2012, which is incorporated by reference herein in its entirety.

FIELD OF THE INVENTION

The apparatuses and methods described herein are generally applicable to the field of measurement. The embodiments shown and described herein are more particularly for measuring the amount of movement between a steering kingpin and the kingpin housing.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable.

AUTHORIZATION PURSUANT TO 37 C.F.R. §1.71 (d)

A portion of the disclosure of this patent document contains material which is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limited of its scope, the invention will be described and explained with additional specificity and detail through the use of the accompanying drawings.

DETAILED DESCRIPTION

Listing of Elements

| Element Description | Element Number |
| --- | --- |
| Measuring System | 10 |
| Wheel | 12 |
| Axle | 14 |
| Kingpin housing | 16 |
| Spindle | 17 |
| Conduit | 18 |
| Sensor | 20 |
| Sensor body | 21 |
| Cover | 22 |
| Contact member | 24 |
| Contact member tip | 24a |
| Contact member base | 24b |
| Biasing member | 25 |
| Moveable member | 26 |
| Moveable member tip | 26a |
| Moveable member base | 26b |
| Bracket | 30 |
| Bracket body | 31 |
| Aperture | 32 |
| Tensioner | 34 |
| Post | 36 |
| Positioner | 40 |
| Positioner arm | 42 |
| First clamp | 44 |
| First clamp arm aperture | 44a |
| Bracket aperture | 44b |
| Clamp tensioner | 45 |
| Second clamp | 46 |
| Second clamp arm aperture | 46a |
| Base | 50 |
| Base body | 51 |
| Switch | 51a |
| Base arm | 52 |
| Controller | 60 |

DETAILED DESCRIPTION

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

1. Illustrative Embodiments

Figure 1:
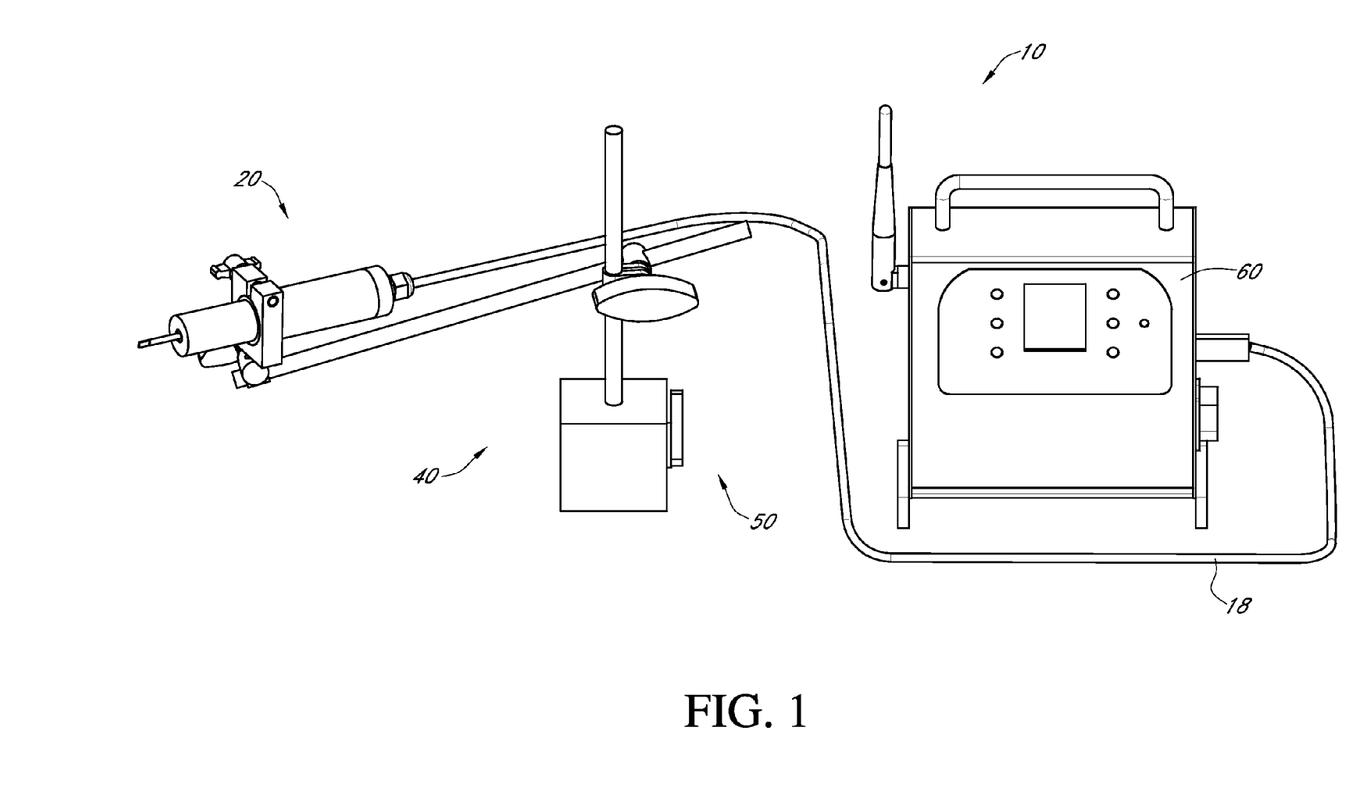
FIG. 1 provides a perspective view of a first embodiment of the measuring system.

Referring now to the drawings, wherein like reference numerals designate identical or corresponding parts throughout the several views, FIG. 1 provides a perspective view of one embodiment of a measuring system 10 using a controller 60. The measuring system 10 is generally comprised of a sensor 20, a structure for selectively mounting the sensor 20, and a logic circuit.

Figure 2:
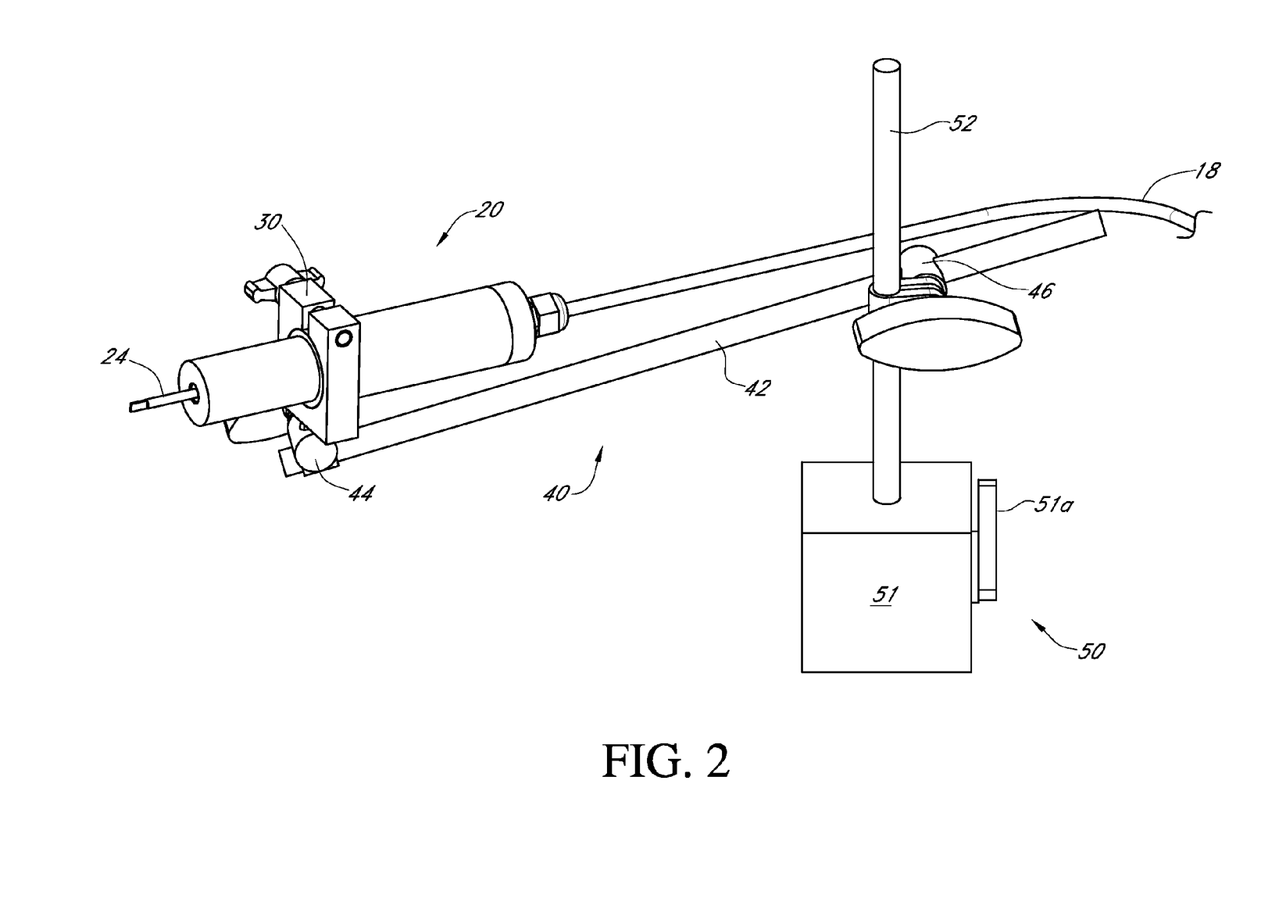
FIG. 2 provides a perspective view of one embodiment of a sensor and positioner that may be used with the measuring system.
Figure 4A:
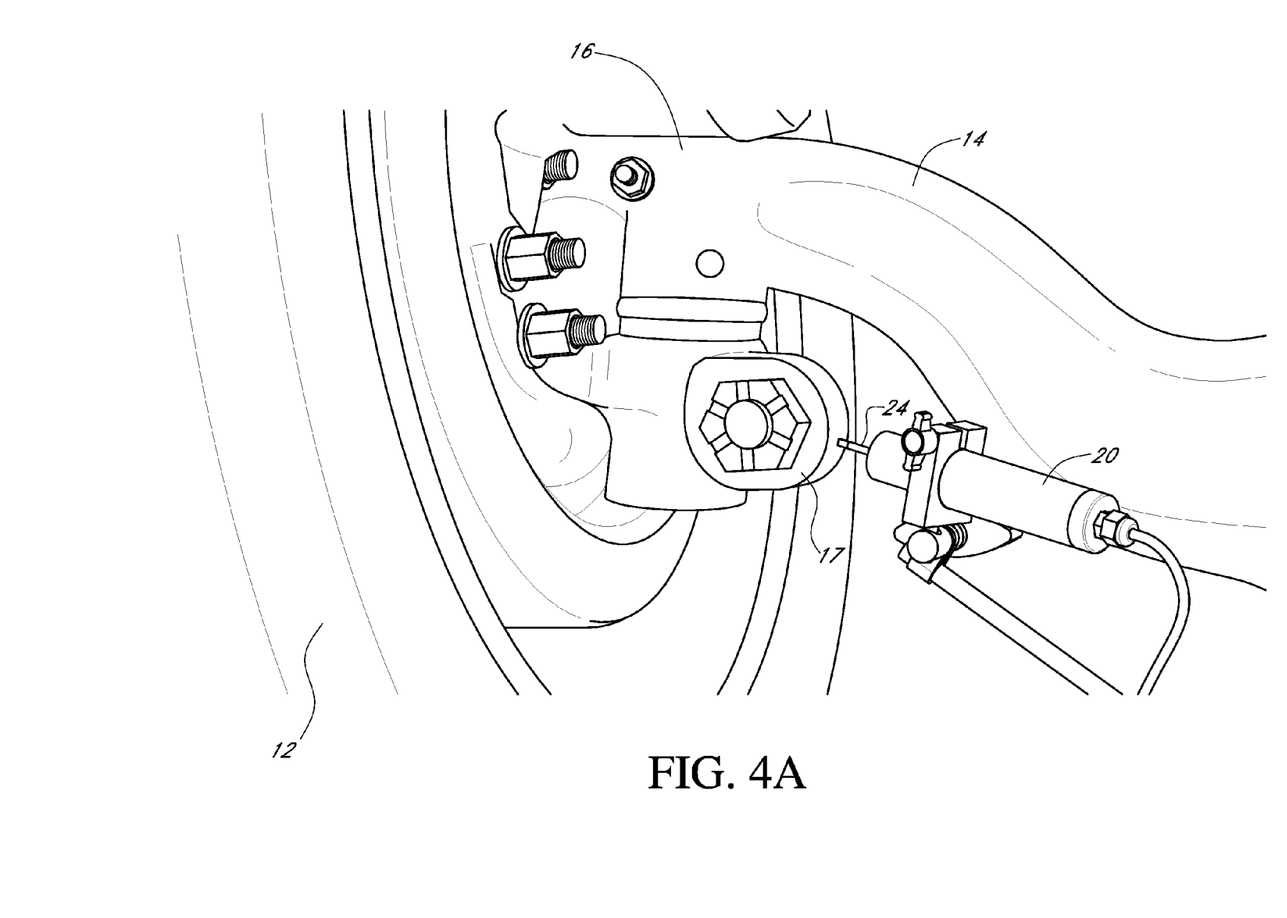
FIG. 4A provides a perspective view of the sensor and positioner shown in FIG. 2 wherein the positioner is engaged with an axle.
Figure 4B:
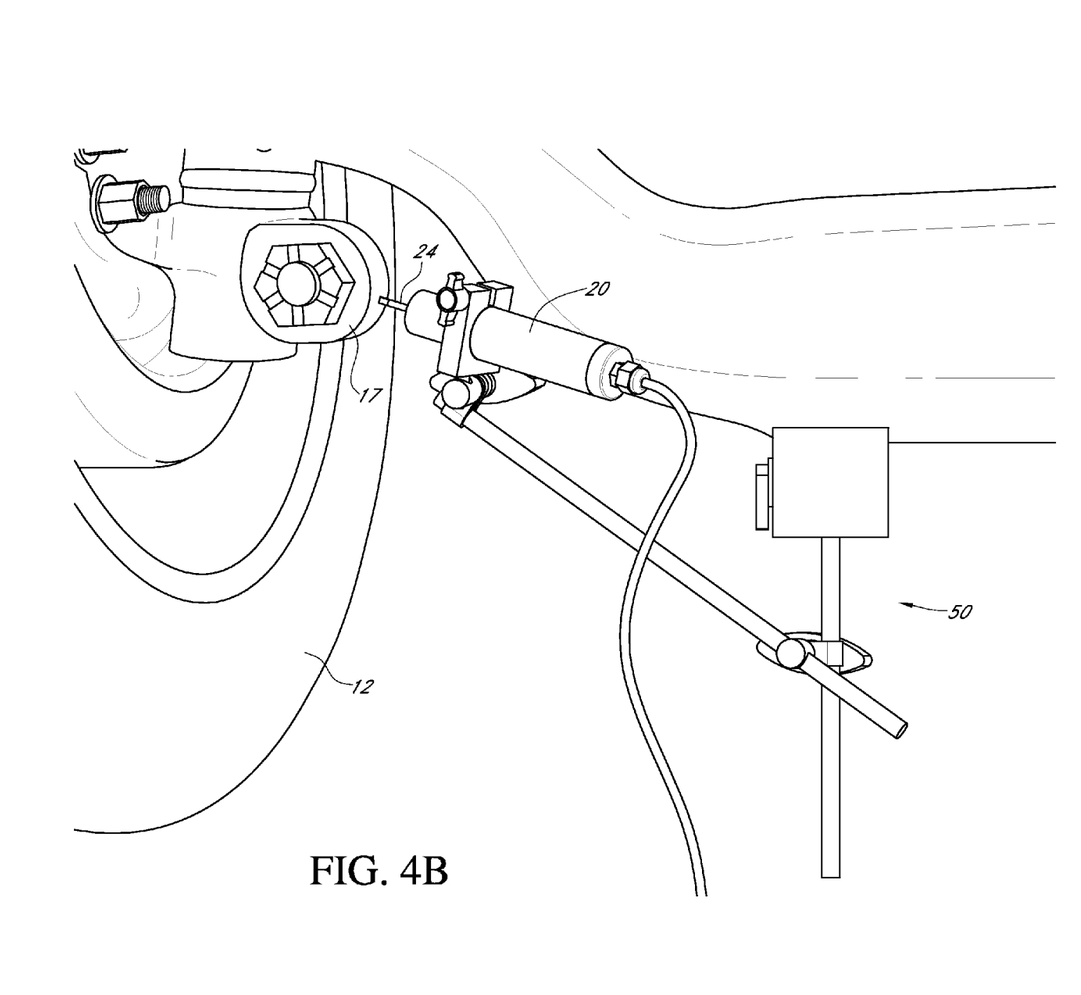
FIG. 4B provides another view of the positioner, sensor, and axle shown in FIG. 4A.

As shown in FIG. 2, the sensor 20 may be configured with a contact member 24 extending therefrom. The sensor 20 may also be selectively engaged with a bracket 30. The bracket 30 may be selectively engaged with a positioner 40, which may be selectively engaged with a base 50. Finally, the base 50 may be configured for selective engagement with a structure (e.g., an axle 14 as shown in FIGS. 4A & 4B).

Figure 3:
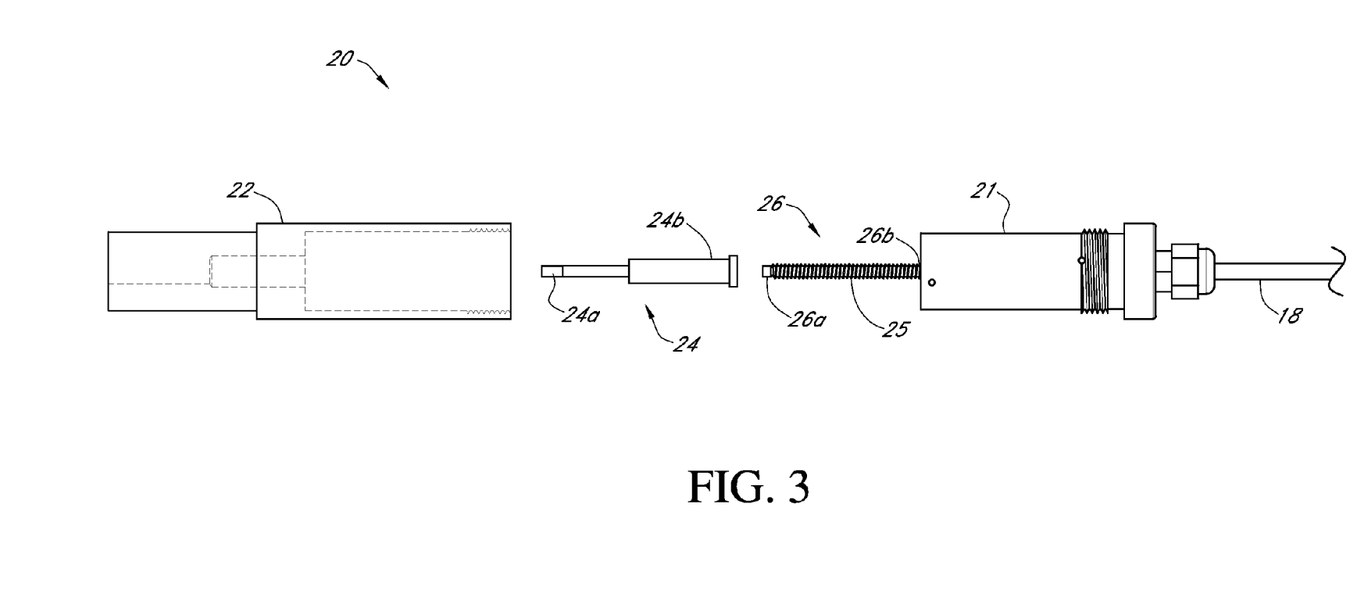
FIG. 3 provides a side view of the sensor shown in FIG. 2 wherein the sensor body and contact member have been removed.
Figure 7:
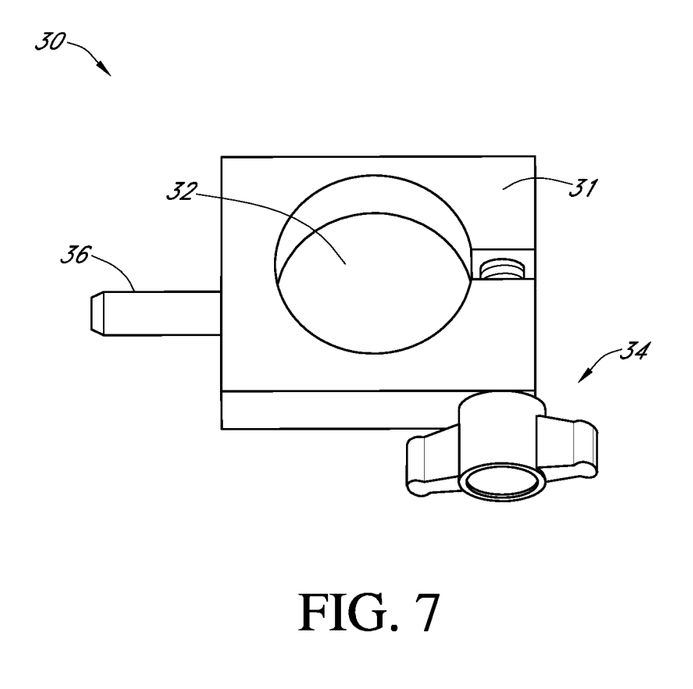
FIG. 7 provides a perspective view of one embodiment of a bracket that may be used with various embodiments of the measuring system.

Still referring to FIG. 2, the sensor 20 may be secured to the bracket 30 by positioning the sensor 20 in the aperture 32 of the bracket 30 and adjusting the tensioner 34 so that the bracket body 31 engages the sensor 20. A detailed view of one embodiment of a sensor 20 is shown in FIG. 3, and FIG. 7 provides a detailed view of one embodiment of a complimentary bracket 30. As shown in FIG. 3, the sensor 20 may be configured to include a sensor body 21 over which a cover 22 may be secured. In the illustrative embodiment of a sensor 20, the cover 22 is engaged with the sensor body 21 via cooperating threads on the sensor body 21 and the cover 22.

The sensor 20 may include a moveable member 26 protruding from the sensor body 21. The moveable member 26 may include a moveable member base 26a adjacent and/or positioned within the sensor body 21 and a moveable member tip 26a opposite the moveable member base 26b. In the illustrative embodiment of the sensor 20 the moveable member 26 may move by a predetermined amount with respect to the sensor body 21 in the fore/aft direction along the longitudinal axis thereof. A biasing member 25 may be cooperatively engaged with both the sensor body 21 and moveable member 26 to bias the moveable member 26 in a distal direction with respect to the sensor body 21. In the illustrative embodiment of the sensor 20, the sensor 20 is able to detect different positions of the moveable member 26 with respect to the sensor body 21 using a potentiometer. The potentiometer used in the sensor 20 may be any type of potentiometer that is suitable for the particular application of the measuring system 10, including but not limited to a linear potentiometer configured as a displacement tranducer. The sensor 20 may then relay this positional information as an electric signal to a controller 60 or other logic circuit via conduit 18 and/or wirelessly, depending on the embodiment of the measuring system 10. The conduit 18 may be any conduit 18 acceptable for the particular application of the measuring system 10, including but not limited to USB or Category 5 network cables. In other embodiments of a sensor 20 not pictured herein, the sensor 20 may use a method and/or structure other than a potentiometer that measures the relative position of a moveable member 26 with respect to a sensor body 21 without departing from the spirit and scope of the measuring system 10 as disclosed and claimed herein. For example, in an embodiment of a sensor 20 not pictured herein, a photo eye (not shown) may be used to determine the position of a moveable member 26 (or spindle 17) with respect to a fixed structure (e.g., axle 14, base 50, positioner 40). Accordingly, the specific method and/or structure for detecting, relaying, and/or measuring the relative positions of two components in no way limits the scope of the measuring system 10 as disclosed and claimed herein.

In the illustrative embodiment of a sensor 20 as pictured herein, a contact member 24 may be cooperatively engaged with the moveable member 26 so as to communicate certain mechanical forces thereto. The moveable member tip 26a may be positioned within the contact member base 24b, and the contact member base 24b may fit within the cover 22 when the sensor 20 is fully assembled. The contact member tip 24a may protrude from the distal axial face of the cover 22 to engage an external structure, as depicted in FIGS. 4A & 4B for an axle 14 and spindle 17. As will be apparent to those of ordinary skill in the art in light of the present disclosure, the contact member 24 may communicate to the moveable member 26 relative positions in the fore/aft direction along the longitudinal axis of the sensor 20. The contact member 24 and cover 21 may prevent ingress of certain debris and contaminants to the sensor 20, thereby increasing the robustness and longevity thereof.

As previously mentioned, the sensor 20 may be cooperatively engaged with a bracket 30. In the illustrative embodiment of the measuring system 10 the sensor 20 may be positioned in the aperture 32 of the bracket 30. The sensor 20 may rotate about its longitudinal axis and move in the fore/aft direction along its longitudinal axis with respect to the bracket 30 depending on the adjustment of the tensioner 34, which may be configured as a threaded member and tapped hole. A post 36 may extend from the bracket body 31 to cooperatively engage with bracket with a positioner 40 via a first clamp 44, which positioner 40 is described in detail below.

Figure 5:
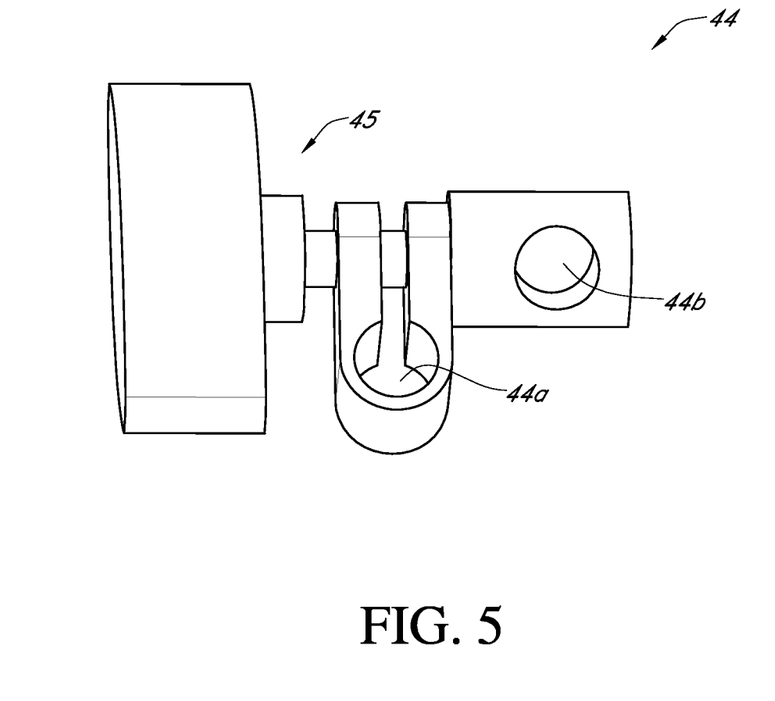
FIG. 5 provides a perspective view of one embodiment of a first clamp that may be used with various embodiments of the measuring system.
Figure 6:
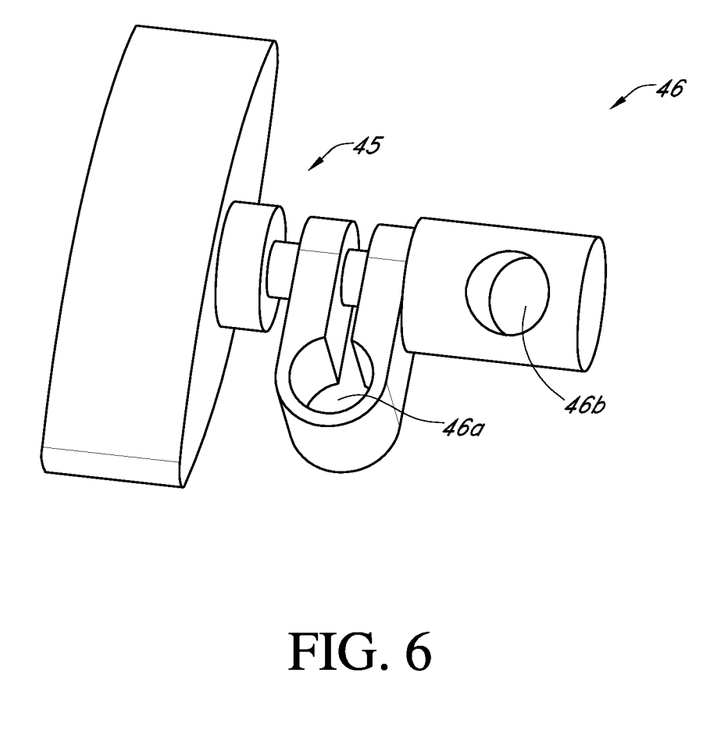
FIG. 6 provides a perspective view of one embodiment of a second clamp that may be used with various embodiments of the measuring system.

Generally, the illustrative embodiment of a positioner 40 includes first and second clamps 44, 45 (shown in detail in FIGS. 5 & 6, respectively) selectively engaged with a positioner arm 42. The first clamp 44 may include a bracket aperture 44b into which the post 36 of the bracket 30 may be positioned. The bracket 30 may selectively rotate with respect to the first clamp 44 about the longitudinal axis of the post 36 such that the desired orientation of the bracket 30 with respect to the first clamp 44 may be adjusted and secured by the user.

The first clamp 44 may also include a first clamp arm aperture 44a into which the positioner arm 42 may be inserted. The position of the first clamp 44 along the length of the positioner arm 42 and the rotational position of the first clamp 44 about the periphery of the positioner arm 42 may be adjusted and secured by the user via the clamp tensioner 45. In the illustrative embodiment, the clamp tensioner 45 of the first clamp 44 is formed with a threaded member and a tapped hole, but the scope of the measuring system 10 is in no way limited thereby.

The second clamp 45 may include two second clamp arm apertures 46a into which either the positioner arm 42 or base arm 52 may be inserted. The position of the second clamp 46 along the length of the positioner arm 42 and/or base arm 52 and the rotational position of the second clamp 46 about the periphery of the positioner arm 42 and/or base arm 52 may be adjusted and secured by the user via the clamp tensioner 45 on the second clamp 46. In the illustrative embodiment, the clamp tensioner 45 of the second clamp 46 is formed with a threaded member and a tapped hole, but the scope of the measuring system 10 is in no way limited thereby.

The base 50 in the illustrative embodiment of a measuring system 10 may include a base body 51 to which a switch 51a may be mounted and a base arm 52 extending from the base body 51. The base body 51 may include a magnet (not shown) that is selectively energizeable via the switch 51a so that the base 50 easily secured and subsequently removed from the surface of a ferrous material (e.g., an axle 14). As previously described, the positioner 40 may be selectively engaged with the base arm 52, and consequently with the base 50, via the second clamp 46. Accordingly, the sensor 20, bracket 30, and positioner 40 allow for at least eight degrees of adjustment. However, in other embodiments the number of degrees of adjustment available to the user may be greater than eight, and in still other embodiments the degrees of adjustment may be less than eight without limitation to the measuring system 10 as disclosed and claimed herein.

In another embodiment of a sensor 20 not pictured herein, the contact member 24 may be configured with a contact member tip 24a formed with a rotatable member thereon, such as a wheel. It is contemplated that totable member engaged with the contact member tip 24a may be oriented such that the rotational axis of rotatable member is generally perpendicular to the longitudinal axis of the contact member 24. However, the scope of the present disclosure is not so limited. In such an embodiment, the sensor 20 may be especially useful for gauging the runout of a round body, including but not limited to a a wheel, flywheel, etc. Other embodiments of the sensor 20 may have a contact member 24 differently configured for determining small variances in dimension and/or shape.

As previously mentioned, the sensor 20 may be in communication (either via conduit 18 or wirelessly) with a controller 60. The controller 60 may be comprised of a stand-alone microprocessor (with or without a display), or may be comprised of a larger central processing unit. It is contemplated that in any case, the controller 60 will contain software and/or firmware capable of communicating with the sensor 20 and/or storing data retrieved therefrom.

2. Illustrative Method of Use

Having described an illustrative embodiment of the measuring system 10, one method of using the measuring system 10 having a controller 60 will now be described. Other methods of using the measuring system 10 exist, and the illustrative method is therefore in no way limiting to the scope of the measuring system 10 as described and claimed herein.

The illustrative embodiment of a measuring system 10 as pictured herein may be used to measure the amount of relative motion of the kingpin with respect to the kingpin housing 16 as often used in the steering system of a heavy duty vehicle. As shown in FIGS. 4A & 4B, the base 50 of the measuring system 10 may be selectively engaged with the axle 14 (using the magnet and associated switch 61a) adjacent one of the front wheels 12. The base 50, positioner 40, and bracket 30 all may be configured such that the relative positions thereof are fixed with respect to the axle 14. It is contemplated that the sensor 20 will be positioned such that the contact member tip 24a is contacting the spindle 17, and such that the contact member 24 is depressed by a predetermined amount (e.g., 0.25 inches) so that the sensor 20 may detect position changes in both the fore and aft directions.

Once the sensor 20 is properly positioned and secured, the user may set a zero using the controller 60. At this point, the user may also input into the controller 60 an acceptable amount of travel between the kingpin and kingpin housing 16. Next, the user may raise the axle 14 so that the wheels 12 experience no load other than the weight of the wheels 12 themselves. At this point the user may record a reading from the sensor 20 to determine the amount of wear between the kingpin and kingpin housing 16. The controller 60 may communicate (either via conduit 18 or wirelessly) this reading to a database or other computer for later viewing, printing, or other use.

The user may now deactivate the magnet on the base 50 via the switch 51a and properly position and secure the sensor 20 on the axle 14 adjacent the other wheel 12. At this point, the user may lower the axle 14 to place a load thereon and record a reading from the sensor 20 to determine the amount of wear between the kingpin and kingpin housing 16 associated with that wheel 12. Alternatively, the user may first lower the axle 14 to place a load thereon and then properly position and secure the sensor 20 on the axle 14 adjacent the other wheel 12. The user may then raise the axle 14 to remove the load therefrom and then record a reading from the sensor 20. In either case, the controller 60 may communicate the reading associated with the other wheel 12 (either via conduit 18 or wirelessly) to a database or other computer for later viewing, printing, or other use. Used in this manner, the measuring system 10 objectifies the amount of wear in a kingpin using a reliable, accurate, and repeatable process. The results of the process may be distributed to owners and/or operators for record keeping and/or compliance with various regulations.

To achieve the desired resiliency and longevity, the various components of the measuring system 10 may be constructed of any material that is sufficiently robust and/or resistant to degradation for the particular application of the measuring system 10. Such materials include various grades of carbon steel, polymers, aluminum, carbon-based woven fiber materials, aluminum, aluminum alloys, or combinations thereof.

It should be noted that the measuring system 10 is not limited to the specific embodiments pictured and described herein, but is intended to apply to all similar apparatuses for measuring and/or recording the relative motion between two structures. Accordingly, modifications and alterations from the described embodiments will occur to those skilled in the art without departure from the spirit and scope of the measuring system 10.

What is claimed is:

1. A measuring system comprising:
 a. a sensor, wherein said sensor is formed with a moveable member extending outwardly, and wherein a portion of said moveable member is configured to engage a first external structure, wherein said first external structure is defined as a spindle;
 b. a positioner configured to engage said sensor, wherein said positioner provides at least two degrees of movement to said sensor when said sensor is engaged with said positioner;
 c. a base configured for selective engagement with a second external structure defined as an axle, wherein said base is also configured to selectively engage said positioner; and
 d. a biasing member, wherein said biasing member is configured to bias said moveable member by a predetermined amount in a direction outward from said sensor.

2. A measuring system comprising:
 a. a sensor comprising:
  i. a sensor body;
  ii. a moveable member slideably mounted within said sensor body;
  iii. a contact member engaged with said moveable member;
 b. a positioner comprising:
  i. a bracket having an aperture formed in a bracket body, wherein said sensor may be selectively engaged with said bracket;
  ii. a positioner arm;
  iii. a first clamp cooperatively engaged with said bracket and said positioner arm;

iv. a second clamp cooperatively engaged with said positioner arm;
c. a base comprising:
i. a base body;
ii. a base arm extending from said base body, wherein said base arm is cooperatively engaged with said second clamp;
d. a controller in communication with said sensor, wherein said controller is capable of detecting readings of said sensor.

3. The measuring system according to claim 2 wherein said sensor further comprises a linear potentiometer operably engaged with said moveable member, wherein said potentiometer is configured as a displacement transducer.

4. The measuring system according to claim 3 wherein said sensor further comprises a biasing member, wherein said biasing member is configured to bias said moveable member by a predetermined amount in a direction outward from said sensor.

5. The measuring system according to claim 4 wherein said controller is further defined as communicating with said sensor in a wireless manner.

6. The measuring system according to claim 5 wherein said contact member is further defined as being parallel to said moveable member, and wherein said contact member is linear.

7. The measuring system according to claim 5 wherein said contact member is further defined as being rotatable with respect to said moveable member.

8. The measuring system according to claim 6 wherein said base body further comprises a magnet, and wherein said magnet is selectively energizable via a switch positioned on said base.

9. A method for measuring the motion of a kingpin relative to a kingpin housing, said method comprising the steps of:
a. engaging a base of a measuring system with an axle associated with said kingpin housing, wherein the position of said base with respect to said axle and said kingpin housing is secure;
b. engaging a positioner of said measuring system with said base, wherein the position of said positioner with respect to said base is secure;
c. placing a bracket adjacent a distal end of said positioner, wherein the position of said bracket with respect to said positioner is secure;
d. engaging said bracket with a sensor, wherein the position of said sensor with respect to said bracket is secure, and wherein a movable member of said sensor is engaged with said kingpin;
e. placing a controller in communication with said sensor such that said controller is capable of detecting movement of said moveable member;
f. unloading said kingpin;
g. determining the position of said moveable member;
h. loading said kingpin; and,
i. calculating the difference between said moveable member when said kingpin is loaded and when said kingpin is unloaded.

10. The method according to claim 9 wherein said base is further defined as engaging said axle via an electro-magnet positioned on said base.

11. The method according to claim 10 wherein said base further comprises a base arm, and wherein said positioner is engaged with said base via said base arm.

12. The method according to claim 11 wherein said positioner may rotate with respect to said base about the longitudinal axis of said base arm.

13. The method according to claim 12 wherein said sensor further comprises a linear potentiometer configured as a displacement transducer.

14. The method according to claim 13 wherein said positioner further comprises a first and a second clamp, wherein said first clamp provides an engagement point for a bracket, wherein said bracket directly engages said sensor, and wherein said second clamp provides an engagement point for said base arm.

* * * * *